July 14, 1953  Y. PONSAR  2,645,089
AUTOMATIC GATE
Filed Dec. 22, 1948
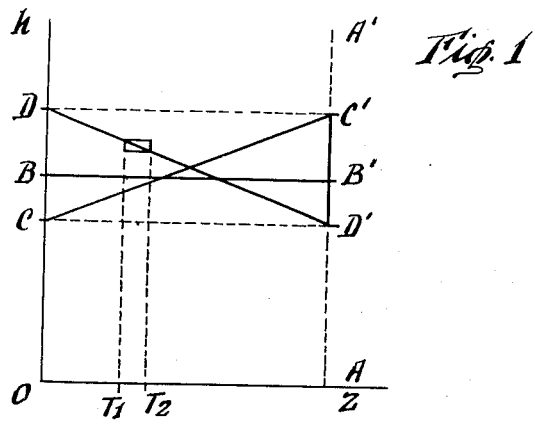
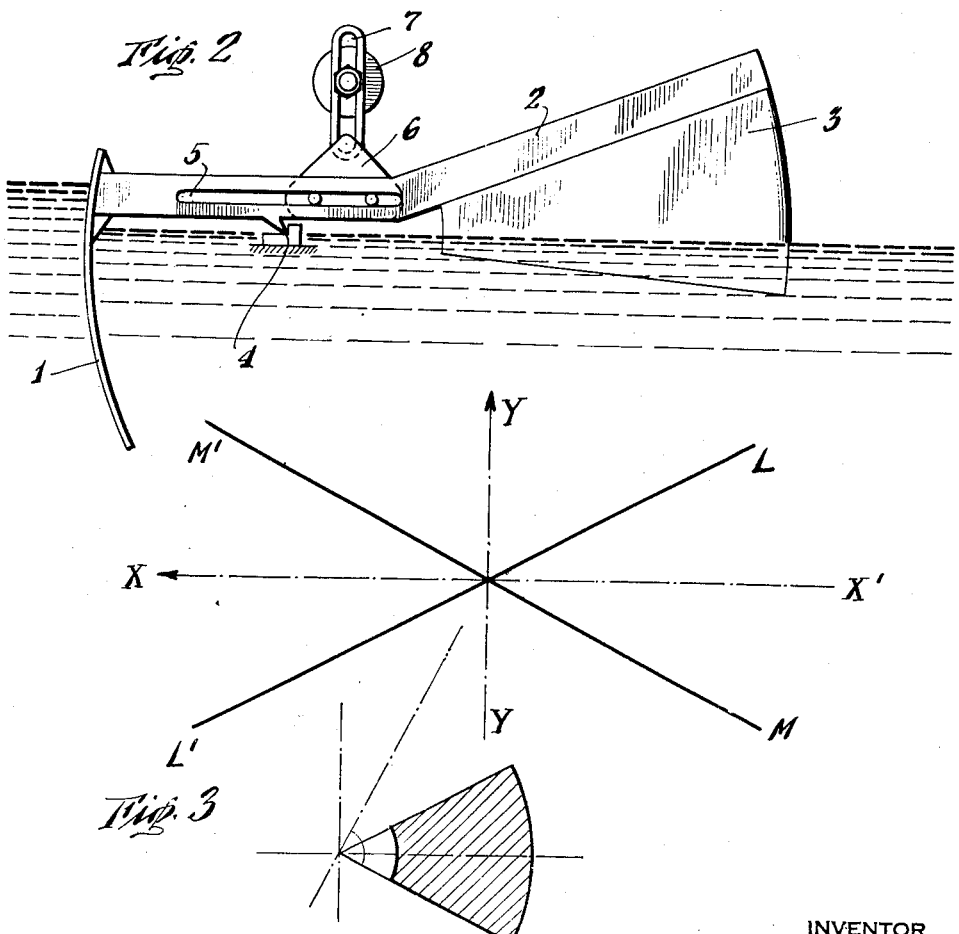
INVENTOR
Yves Ponsar
BY Corey & Jacobs
ATTORNEYS Patented July 14, 1953

2,645,089

UNITED STATES PATENT OFFICE 2,645,089

AUTOMATIC GATE

Yves Ponsar, Grenoble, France, assignor to Etablissements Neyrpic, Grenoble, France, a corporation of the French Republic Application December 22, 1948, Serial No. 66,788
In France December 27, 1947

3 Claims. (Cl. 61—25)

The present invention relates to automatic gates controlled by compensated floats, that is to say, gates in which the thrust of the water on the float activating the gate is compensated by an opposing couple variable with the inclination of the movable mechanism in such a manner that for one predetermined or "privileged" level the gate is in indifferent equilibrium in all its positions.

The invention has for one of its objects an improvement in the arrangements for adjusting the center of gravity of compensated float controlled automatic gate systems to establsh a predetermined decrement of regulation.

The invention will be hereinafter more particularly described with reference to the accompanying drawings, in which:

Fig. 1 is a graph illustrating diagrammatically the conditions affecting regulation of the decrement under various conditions encountered in the use of the gate;

Fig. 2 is a side elevation of a compensated float controlled automatic gate embodying the structural features of the present invention; and Fig. 3 is a diagram illustrating the positions assumed by the center of gravity in establishing decrements of regulation of different values.

One may cite, as an example of the kind of automatic gates to which this invention is particularly applicable, those which are disclosed in U. S. Patent No. 2,168,117 and those which are disclosed in my pending U. S. application Serial No. 9,576, filed February 19, 1948.

In these systems, a force couple which opposes movement of the gate by the float is generally exerted by the weight of the movable mechanism, the center of gravity being displaced with reference to the axis of rotation. There is a certain position of the center of gravity which will be designated herein as $G_0$ and for which the equilibrium of such a system is exactly indifferent for a given level. This fact may be expressed otherwise by saying that in this case the decrement of regulation is zero. By "decrement" is meant the variation of the liquid level for which the apparatus makes the whole of its useful stroke in bringing about the regulation.

If such a compensated float system were situated in an expanse of quiet water, it would be able to occupy any position whatever while the level is at the predetermined or preferred point. For a higher level, the float would rise up to its higher limit or stop and for a lower level, it would descend to its lower limit.

These considerations may be shown on a graph represented by Fig. 1. On the ordinate $h$ is shown the regulated level and on the abscissa $z$ the corresponding angular position of the float is shown. The origin ($z=0$) corresponds to the low position of the float at its lower limit (gate open) and the point A corresponds to the high position of the float at its upper limit (gate closed). A functioning having zero decrement is expressed by the broken line OBB'A'. For a level lower than B, the float rests on its lower stop. For a level equal to B the float is in indifferent equilibrium and may find itself at any position of its course, the representative point being between B and B'. For a level higher than B, the float is in contact with its upper stop.

On the other hand, a slightly positive decrement corresponds to a course such as OCC'A'. For a level lower than C the float rests on its lower stop; for a level higher than C', the float is in contact with its upper stop; there is no longer any preferred or predetermined level BB', but between the two levels C and C' the float occupies a position which is a function of the level.

There is a corresponding position of the float for each level and this is a position of stable equilibrium. In reality, if for a level taken between C and C' the float is slightly depressed and then left to itself, it receives a supplemental thrust which tends to restore it to its initial position and inversely. This kind of operation is classic and is found in most automatic gates.

According to the invention, the regulation of this decrement is not caused by modification of the lever arms, but by displacement of a counterweight.

The present invention consists in arrangements permitting convenient regulation of the decrement of automatic gates of the types described in the patent and the application cited above, as well as certain interesting applications of specific regulation. The gates forming the object of the above patent and application have counterweights the displacement of which varies the position of the center of gravity of the movable mechanism. It is known that up until now it has always been the endeavor to regulate the position of this center of gravity as closely as possible to the precise position $G_0$ so as to obtain a zero decrement or in a neighboring position in order to obtain a small positive decrement. The regulation of the counterweights presents certain difficulties because the precise position of the center of gravity for zero decrement is unknown beforehand. It is necessary, therefore, to bring about this regulation for a first position of the movable mechanism, then to bring it into another position and to correct the regulation in such manner as to obtain a new equilibrium. Unfortunately, for want of taking the desired precautions, the second regulation generally destroys the first and it all must be repeated.

According to the invention set forth in the Danel Patent No. 2,168,117, above cited, a first static regulation of the apparatus is conducted, that is to say, its equilibrium is assured, and the center of gravity is located on the vertical of the axis of rotation. For this position the float is obviously at its upper stop or even a little higher. This regulation is obtained by displacement of the counterweight in a horizontal or slightly inclined plane.

The second regulation responds to the theory of this kind of automatic gate, according to which the center of gravity $G_0$ must find itself on a privileged straight line passing through the axis of rotation. Whatever be the movement of the first regulation it consists in bringing the center of gravity onto this desired straight line.

It is significant that the second regulation consists only of a displacement of the center of gravity on this line; otherwise, the first regulation would be destroyed.

The counterweights of the gates, according to the present invention, are therefore mounted on two slides forming between them a certain angle and of which one at least must be parallel to the desired line defined above. The first regulation is effected by displacing the counterweight in the corresponding slide, then the second by displacing it in the slide which is parallel to the desired line.

This method of regulation permits not only of bringing the center of gravity into its desired position $G_0$, but, moreover, of bringing it into any desired point around $G_0$, so as to give to the apparatus a decrement different from zero and of the desired value.

One method of specific regulation of the center of gravity consists in placing it at a certain angle, determined with relation to $G_0$, and for which a negative decrement is obtained. Let us refer to Fig. 1 in order to see what the effect of a negative decrement would be. The corresponding curve is then, for example ODD'A'. The float resting on its lower stop, remains there so long as the level is lower than D. When the level rises and reaches the level D, the float has a tendency to rise and it will be noticed that because of the negative inclination of the curve of the equilibrium positions D'D and of the possibility of another equilibrium on the limiting stop for the same level, these points correspond to unstable equilibrium such that any rising movement once begun continues until the upper limit is reached.

If the level goes a little beyond D the float rises immediately up to its higher limit, the figurative point changing its place on the horizontal DC'. If now the level goes down again, the float remains in contact with its upper stop as long as the level is higher than D', and if the level goes below D' even a little, the float will descend immediately to its lower limit traversing the horizontal D'C. The inclined curve DD' may not then be traversed because it corresponds to conditions of unstable equilibrium.

In order to give a physical reality to this curve, let us bring toward one another the two limits $T_1$ and $T_2$, the course of the positions of the float finds itself then on a small rectangle centered on DD' and analogous to the rectangle CDC'D'. In bringing together indefinitely the limits $T_1$ and $T_2$, it is seen that at the limit one is able to obtain a point of equilibrium on DD'. In practice, the limits being normally disposed, the float remains on its lower stop for all levels lower than C and on its higher stop for all levels higher than C'. For levels taken between C and C', it is on one of the two stops according to the direction in which it is displaced. The points C and D may be brought together as much as it is desirable and then there is obtained a functioning in the nature of all or nothing which may be very useful in certain cases where it is desired to avoid partial flows; for example, for flushing out materials from the beds of canals or to avoid the accumulation of materials at a low point of a conduit, this mode of function being brought about only for maximum flows in which the materials are entrained. In such a construction, the float would be located upstream from the gate rather than downstream as in the construction illustrated in the drawing. In fact the gate only opens if the level exceeds a certain point, whereupon it opens entirely and moreover only closes, and then completely, if the level decreases below the predetermined point.

Another particular method of regulating the center of gravity consists in displacing it in a certain direction determined with reference to the point $G_0$ in order to obtain a positive or negative decrement, and this in such a way that the curve CC' of Fig. 1 is a straight line or a concave or convex curve but of continually positive slope. According to the shape of the gate controlled by the float, the stability of a single gate or of several gates placed in parallel is thus improved.

The counter-weight may then be brought into a position such that the line BB' of Fig. 1 is displaced parallel to itself and, if desired, without changing its shape in any appreciable way. This has the effect of modifying the height of the regulating level, without modifying the value of the decrement.

In order better to understand the invention reference will now be made to Fig. 2 wherein is shown, by way of example and without limitation, a preferred embodiment of the apparatus features of the invention.

In Fig. 2 there is shown an automatic gate sector 1 supported on arms 2 which are attached adjacent their opposite ends to the customary float 3. The assembly is pivotally mounted intermediate the ends of the arms 2 on support 4. The arms 2 are provided with guideways 5 in which the member 6 is mounted for sliding movement toward or away from the gate 1. The member 6 is in turn provided with guideways 7 which, in the embodiment shown, extend vertically and at right angles to the guideways 5. A counterweight 8 is mounted for sliding movement in the guideways 7. The guideways 7 are arranged parallel to the line along which the privileged or predetermined position of the center of gravity is established to provide the desired decrement as above described. For this type of gate their direction can be chosen either so as to be substantially perpendicular to the lower face of the float or perpendicular to the bisector of the float.

The first regulation consists in displacing the supporting member 6 and the associated counterweight 8 until the center of gravity is on the desired line in question, which manifests itself by establishing an equilibrium, the movable mechanism having, for example, the horizontal position. The second regulation consists in displacing the counterweight in its vertical guideways as previously described, until there has been obtained an indifferent equilibrium for all positions of the movable mechanism, the level being regulated to the line of the axis. The center of gravity will then be found to be in the so-called "privileged" or preferred position $G_0$. This point is situated on a perpendicular and elevated from the axis of rotation at the axis base line of the float, to a determined distance from the axis. If now, it is desired to place it elsewhere, it is easy to do so by adjustment of the member 6 and the counterweight 8 in their respective guideways to establish precisely any desired new position of the center of gravity with reference to $G_0$.

On Fig. 3, there is shown a diagram indicating the sign of the decrement obtained for the different possible positions of the center of gravity around $G_0$, i. e., that center of gravity for which the decrement is zero, with the level maintained constant at the height of the axis of rotation of the gate.

The lines $LG_0L'$ and $MG_0M'$ are parallel respectively to the flotation lines of the float immerged and emerged. The line $G_0X$ is the interior bisector of the angle $LG_0M$, active opening of the float. The line $G_0Y$ is the perpendicular to this bisector. If the center of gravity G is above the lines $LG_0M'$, the decrement is negative. If it is below $MG_0L'$, it is positive. Between these two zones, it is sometimes negative, sometimes positive.

In order to regulate the decrement to a negative value and obtain the functioning for all or nothing, it is sufficient to place the center of gravity above $LG_0M'$. When the center of gravity G is on the line $Y'G_0Y$ the decrement line is substantially a vertical straight line. The slope of this line varies with $G_0G$ and cancels itself for $G_0G=0$.

The invention further permits the regulation of the regulating level above or below the axis. If the center of gravity G is on the line $X'G_0X$, the decrement line is substantially a horizontal line and the decrement is zero. The constant level is regulated to a distance from the axis of rotation which varies with $G_0G$. This distance cancels itself for $G_0G=0$. The combination of these two effects may be obtained by placing the center of gravity on a point of the plane $XX'YY'$. The characteristics of the decrement (slope and adjustment with reference to the axis of rotation) are then given by the coordinates of the center of gravity G in this plane.

This particular method of regulation has been given by way of indication, but whatever be the type of counterbalanced float, there always exists a position $G_0$ around which the center of gravity may be displaced in obtaining similar effects; the position of the straight line limiting the sectors may easily be determined in each particular case.

The invention is by no means limited to the structure described, but includes equivalent variations, notably in the structure for varying the position of the center of gravity (slides, screws, threaded nuts, etc.) or any other appropriate system and in the structure of the types of gates considered, in particular the structure for balancing the float and the opposing force.

I claim:

1. Apparatus for controlling the flow of water through a conduit, comprising a flow-controlling gate, means supporting said gate including a lever and means pivotally supporting said lever for rotation about a horizontal axis spaced from said gate through an angle sufficient to open and close said gate, a float connected to said lever to move said gate in accordance with variations in the water level, said lever having a guideway extending lengthwise thereof across said axis, a support member adjustably mounted on said lever to allow linear adjustment along said guideway to either side of said pivot means and a counterweight adjustably mounted on said support member to allow adjustment of said counterweight along a linear path substantially at right angles to said linear adjustment of said support member, said support member adjustment being operable to determine the angular position at which said lever, gate and float are in equilibrium for a given liquid level, said counterweight adjustment being operable to change the decrement of the gate and float assembly.

2. Apparatus for controlling the flow of water through a conduit, comprising a flow-controlling gate, means supporting said gate including a lever and means pivotally supporting said lever for rotation about a horizontal axis spaced from said gate through an angle sufficient to open and close said gate, a float connected to said lever to move said gate in accordance with variations in the water level, said lever having a slot therein extending lengthwise of the lever across said axis, a support member mounted on said lever and adjustable lengthwise along said slot to either side of said pivot means, said support member providing a guideway extending upwardly substantially at right angles to said slot, and a counterweight adjustably mounted on said support member for movement along said guideway.

3. Apparatus for controlling the flow of water through a conduit, comprising a flow-controlling gate, means supporting said gate including a lever and means pivotally supporting said lever for rotation about a horizontal axis spaced from said gate through an angle sufficient to open and close said gate, a float connected to said lever to move said gate in accordance with variations in the water level, said lever having a guideway extending lengthwise thereof, a support member adjustably mounted on said lever to allow linear adjustment along said guideway towards and away from said pivot means, said support member being provided with a guideway extending upwardly substantially at right angles to the lever guideway, and a counterweight adjustably mounted on said support member for movement along said upwardly extending guideway.

YVES PONSAR.

References Cited in the file of this patent

UNITED STATES PATENTS

| Number | Name | Date |
|---|---|---|
| 1,581,768 | Wiley | Apr. 20, 1926 |
| 2,168,117 | Danel | Aug. 1, 1939 |
| 2,503,218 | Rundquist | Apr. 4, 1950 |